April 7, 1970          R. G. MILLS          3,504,556

SPEED TRIGGERING DEVICE

Filed April 30, 1968          3 Sheets-Sheet 1

INVENTOR.
ROBERT G. MILLS
BY Daniel Rubin

ATTORNEY

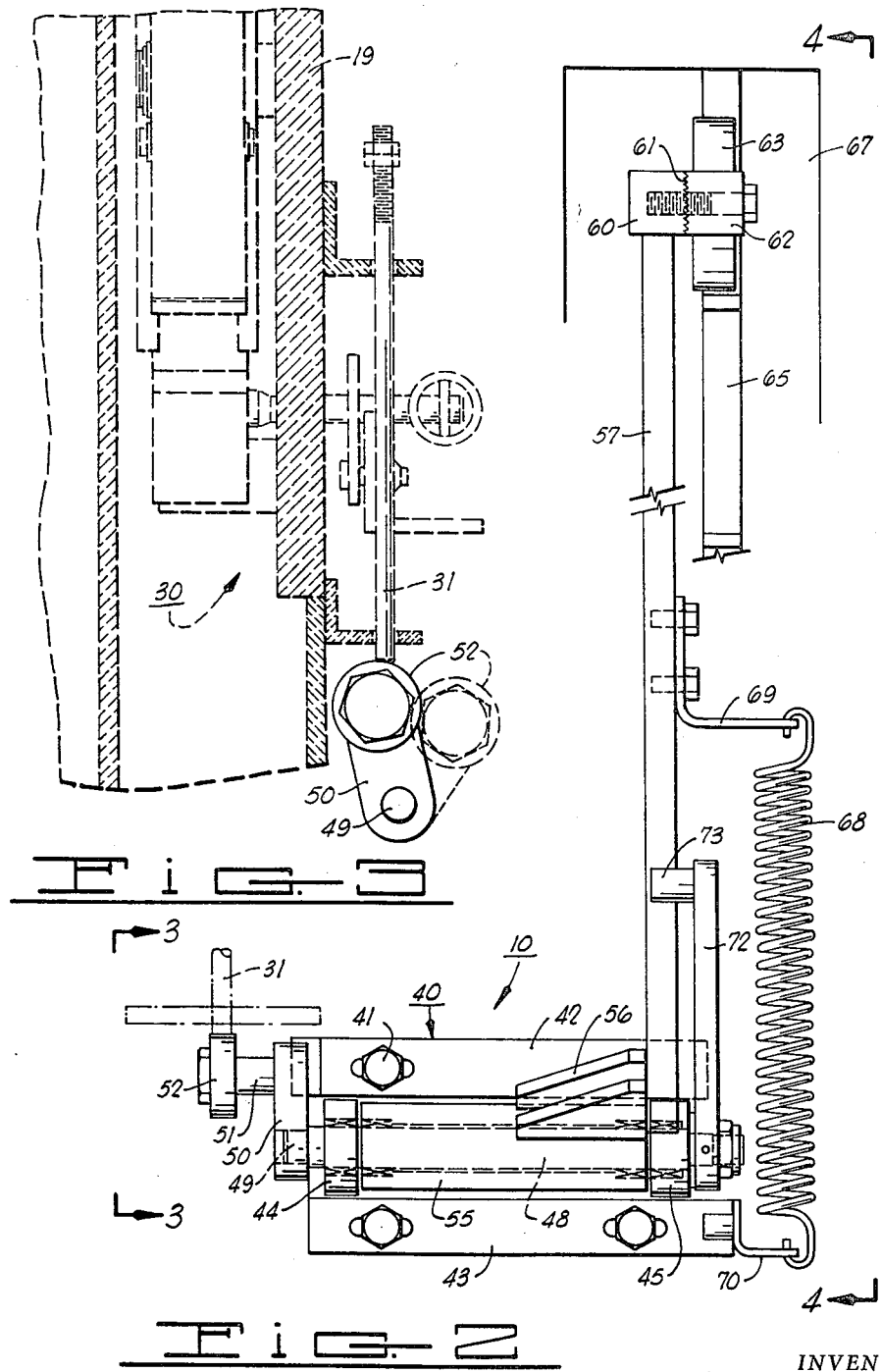

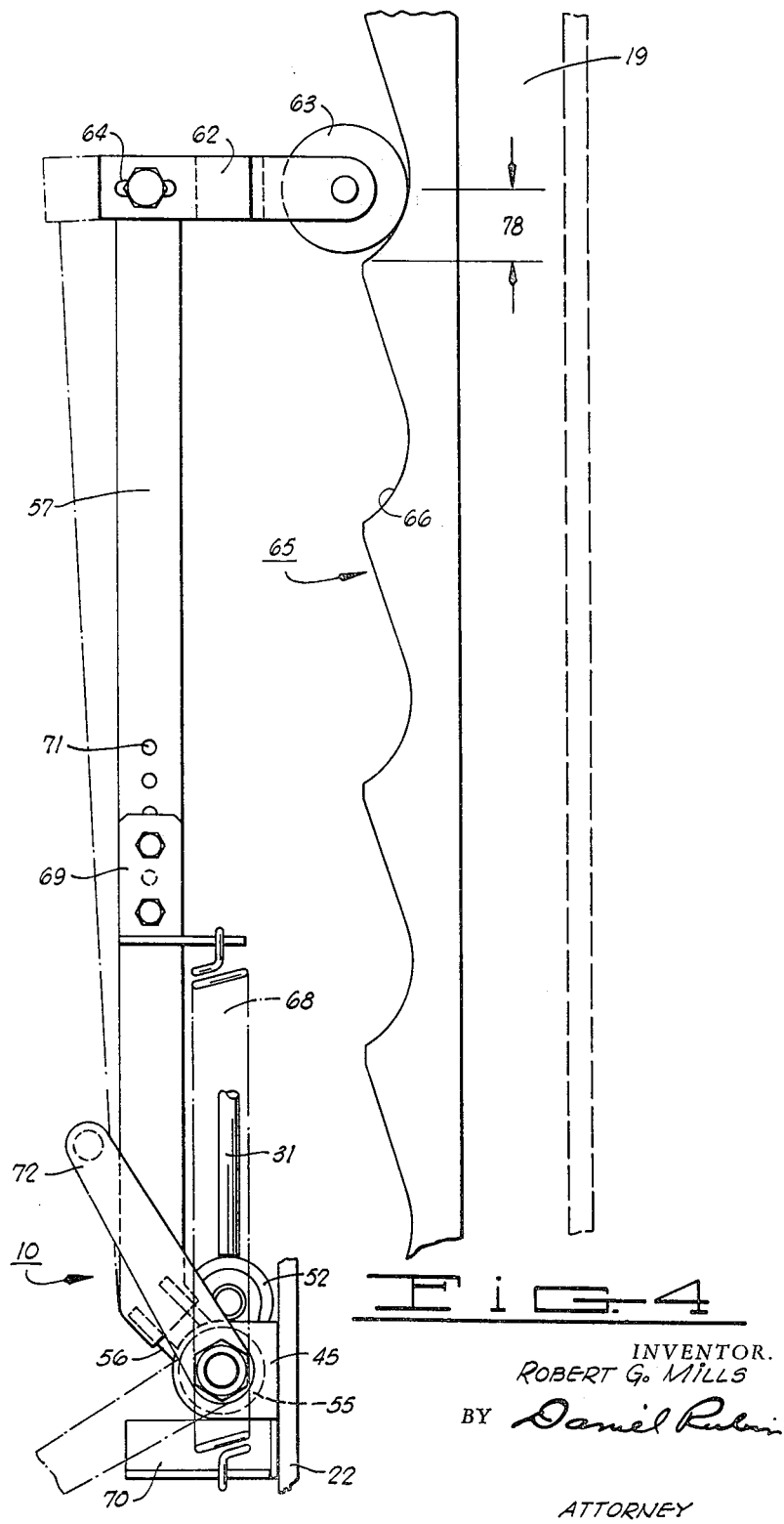

United States Patent Office 3,504,556
Patented Apr. 7, 1970

3,504,556
SPEED TRIGGERING DEVICE
Robert G. Mills, Galt, Ontario, Canada, assignor to Dresser Industries, Inc., Dallas, Tex., a corporation of Delaware
Filed Apr. 30, 1968, Ser. No. 725,406
Int. Cl. F16h 21/44, 21/54, 25/18
U.S. Cl. 74—96                                                9 Claims

ABSTRACT OF THE DISCLOSURE

A device for mechanically actuating a control mechanism when a predetermined velocity is attained between relatively moving parts of an apparatus on which the control mechanism is contained. The device includes a cam track for mounting on one of the parts and a pivot supported follower for mounting on the other of the parts. Excessive speed produces increased pivotal displacement of the follower for actuating a control mechanism.

BACKGROUND OF THE INVENTION

The field of art to which the invention pertains includes the art of mechanical motion sensing devices and in particular to devices of that type capable of actuating a safety control unit such as a brake, switch, alarm or the like in response to detected excessive velocity between relatively moving component parts.

Devices responsive to excess speed variations have been previously known and are common on apparatus such as cranes in which a runaway speed condition usually reflects a lift mechanism failure. Exemplifying cranes of that type is the disclosure of U.S. Patent 3,250,402 in which a safety brake is operative by a physical separation between the triggering device and a brake control mechanism occasioned by relative speed differences of the components to which they are respectively secured. While these prior type devices have given highly satisfactory performance for many years, they are known to provide false signals on the side of safety and to reset themselves as a result of overcoming a signal occasioned by momentary lags from relative acceleration differences. This latter situation is particularly prevalent on vertically moving components on which slack or gravitational drift, even though slight, can cause unwanted braking action.

SUMMARY

The present invention relates to an improved device for mechanically actuating or triggering a control mechanism in response to excess relative speed between component parts. The device is increasingly speed sensitive as compared to prior art devices as to be less susceptible to false indications from acceleration lags and is particularly unaffected by physical separation caused by gravitational drift or the like. Unlike prior units for this purpose, the device hereof is incapable of inadvertent self reset such as to represent an increased safety feature by permitting preliminary investigation of the actuating cause prior to manual reset. Notwithstanding these enhanced performance features, the device is simple in construction yet highly reliable while being capable of being accommodated on a mass majority of existing equipment.

In accordance herewith, a pivoted lever follower secured to one of the relatively moving parts is biased into riding contact against a ripple or wave pitched stationary cam extending in the direction of movement on the other of the relatively moving parts. While the follower is in the latter position, the control mechanism to be actuated is maintained in appropriate normal condition as required. Where however, the follower experiences an excessive velocity, the cam pitch creates a direction velocity component sufficient to overcome the bias and throw the follower about its pivot axis causing an appropriate actuation of the control mechanism.

It is therefore an object of the invention to provide a novel speed sensing device for mechanically triggering a control mechanism.

It is a further object of the invention to provide an improved speed sensing device as in the aforesaid object having higher operational reliability by virtue of increased speed sensitivity as compared to such prior art devices.

It is a further object of the invention to provide a novel speed sensing device capable of operating on vertically moving components while being unaffected by gravitational drift or the like between the relatively movable parts.

It is a still further object of the invention to provide a novel speed sensing device as in the aforesaid objects having a positive response for actuating a control mechanism that is incapable of self reset.

It is a still further object of the invention to provide a novel speed triggering device that is highly reliable in performance yet is simple in construction and lends itself to being accommodated on a mass majority of existing devices.

BRIEF DESCRIPTION OF THE DRAWINGS

FIG. 2 is a front elevation of the triggering device hereof;

FIG. 3 is a fragmentary side elevation taken substantially along the lines 3—3 of FIG. 2; and FIG. 4 is a side elevation taken substantially along the lines 4—4 of FIG. 2.

Figure 1:
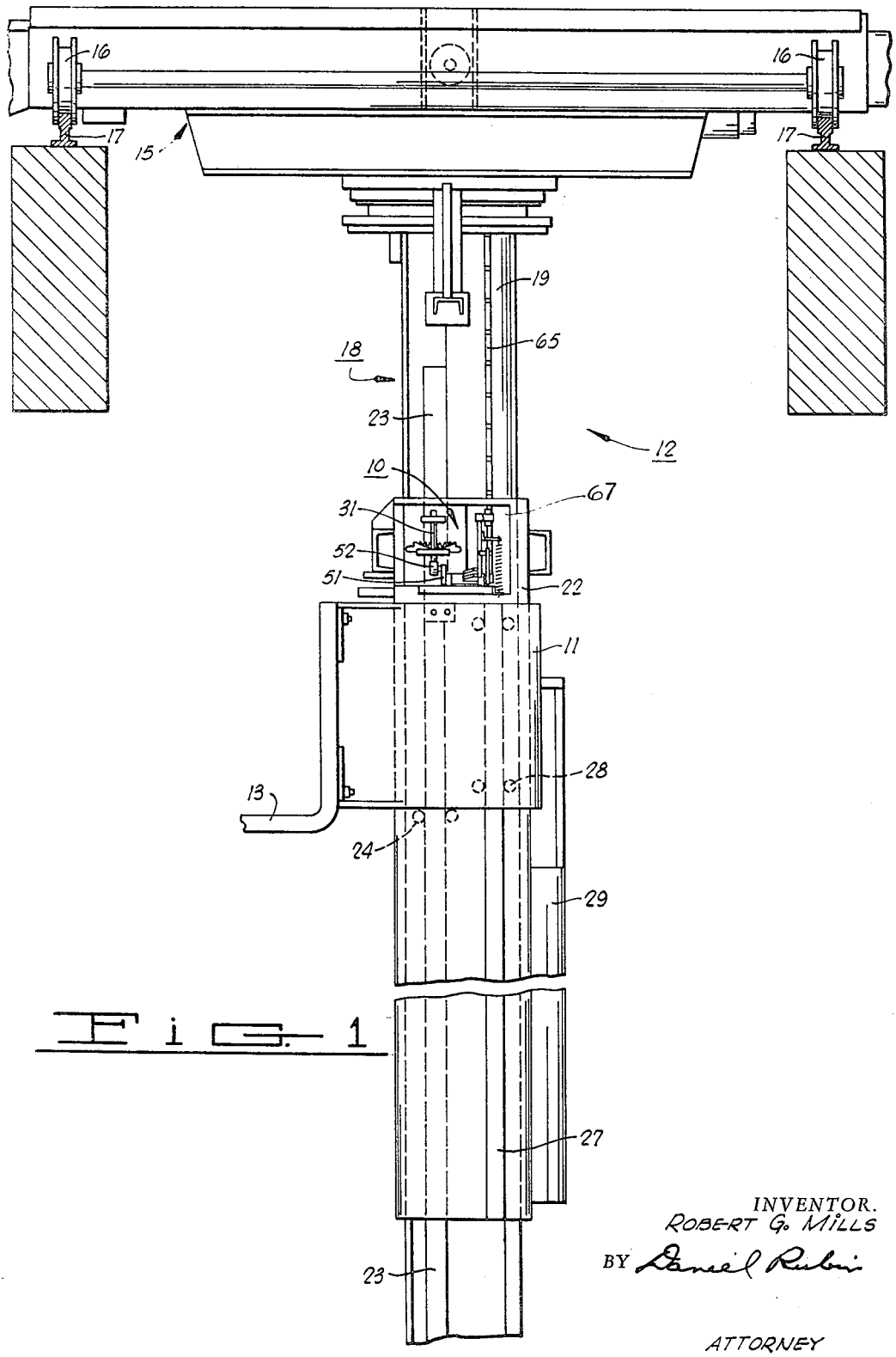
FIG. 1 illustrates a crane in elevation as exemplary apparatus embodying the triggering device hereof.

Referring now to the drawings and initially to FIG. 1, the speed triggering device hereof is designated 10 and is shown for purposes of disclosure mounted onto a stacker crane, generally designated 12, which can comprise a type as disclosed for example in DeLigt Patent 3,250,402 incorporated herein by reference.

The crane briefly comprises a bridge assembly, generally indicated at 15, including a plurality of wheels 16 for riding along a pair of parallel rails 17 suitably supported within the facility to be served by the crane. Depending from the carriage is a mast assembly generally indicated at 18 comprising a fixed mast section 19 dependingly supported and fixed vertically relative to the bridge 15. Telescopically arranged over the fixed mast 19 is in an intermediate mast section 22 guided for movement by means of an elongated rail 23 extending longitudinally along each side and stationary relative to the fixed mast 19. A plurality of rollers 24, carried by the intermediate mast engage with opposite sides of each of the rails 23 to provide rolling movement. Telescopically arranged over the intermediate mast section is a stacker support load carrying section 11 including a stacker unit 13. The section 11 and thus the stacker unit, is guided longitudinally of the intermediate mast by a pair of longitudinally extending rails 27 on opposite sides thereof. A plurality of rollers 28 engaging opposite sides of the rail permits vertical rolling movement of the section 11 relative thereto.

The vertical driving force for the stacker unit is effected via a cable (not shown) supported from the bridge assembly and power driven from a suitable remote source. As shown in FIG. 1, the stacker 13 is in a partially raised condition from the floor disposed generally alongside an operator's cab 29 whereat an operator is substantially at eye level with respect to the load being processed. While not shown, the cable supporting the stacker assembly also supports the intermediate mast section and consequently the cab in the lifted condition thereof. Should, therefore, the cable fail for any reason, both mast sections supported thereby would in the absence of a braking action be unsupported as to drop and possibly cause consequent injury to the crane operator. Accordingly, as a safety feature for just such an event, a safety brake means at 30 (see also FIG. 3) is carried by the intermediate mast section. On too rapid a descent, braking engagement with the guide bar 23 arrests mast fall and locks it in position preventing further drop of the operator's cab. Operation of the brake is controlled by a vertical pin guide rod 31 which is normally held in opposition to a bias force in a raised position at which the brake is completely disengaged. On freeing the rod from its held position, the brake immediately engages to prevent further descent of the cab.

Maintaining guide rod 31 normally in the brake disengagement position and for triggering or actuating brake engagement in the event of cable failure can now be effected in accordance with triggering device 10 of the invention hereof. Rather than being dependent upon vertical separation between the stacker section 11 and the intermediate mast section 22 as in the device of the De Ligt patent supra, the triggering mechanism hereof is self-contained within the intermediate mast as will now be described with particular reference to FIGS. 2–5.

The triggering device hereof includes an elongated mounting bracket 40 which can be secured to the face of the intermediate mast section 22 by means of spaced bolts 41. Bracket 40 consists of an integral unit of individual mounting bars 42 and 43 joined near their ends via a pair of bored axially aligned bosses 44 and 45 for supporting the actuating mechanism by which rod 31 is operable. Extending through the bosses for bearing supported rotation is a central shaft 48. At the leftmost end of the shaft as viewed in FIG. 2 it is formed as a reduced diameter portion 49 on which is force fit an offset crank arm 50. Rotatably connected to the normally extending axial portion 51 of the crank arm is a roller 52 on radial bearings having its peripheral surface in cammed alignment against guide rod 31 for maintaining the latter urged upwardly in brake disengaged position.

Rotatably supported about a central portion of the shaft between the bosses 44 and 45 is a sleeve 55 to which is welded a bracket 56 extending offset for weldment to a radially extending operating arm 57. The uppermost end of the operating arm terminates in a tapped flange 60 having a serrated face 61 to accommodate a bifurcated yoke bracket 62. The latter bracket contains a resilient faced wheel 63 mounted for rotation and which can be preset to an adjusted position by rotatable and axial displacement permitted by adjustable face 61 and elongated slot 64 respectively.

Formed in the wall of stacker section 22 is an aperture 67 through which the operating arm 57 is normally urged in a clockwise direction as viewed in FIG. 4 toward a cam track 65 secured stationary onto fixed mast 19. Biasing the arm in that direction is a tension spring 68 secured between spring brackets 69 and 70 secured in turn to operating arm 57 and bracket bar 43 respectively. It is to be noted that operating arm 57 includes a plurality of bracket taps 71 to which bracket 69 ca nbe secured and thereby adjust spring 68 to a predetermined tension as required. Setting of the spring tension enables at least a partial presetting of the relative speed differences at which the device hereof is operable as will be understood.

Secured to the opposite end of shaft 48 as to be rotatably coupled to crank 50 is a bell crank 72 having a trunnion 73 extending offset from the arm side face to a position closely spaced behind the rearmost edge of operating tion of the bell crank is generally determined by the position of the bell crank is generally determined by the position of roller 52 which is offset from the axis of shaft 48 in a lean position generally wedged beneath the guide rod 31 at the wall surface. This relation prevents inadvertent crank throwing by the normal and expected reciprocating bounce action of the operating arm in response to rolling movement of roller 63 against cam track 65.

As the intermediate mast section 22 therefore moves vertically in relation to the fixed mast section 19, the operating arm 57 experiences a bouncing or reciprocal action as the roller 63 advances in engagement against the wave-form cam pitch of slots 66 serially extending along the vertical length of cam track 65. The normal position of trunnion 73 is such that the counterclockwise pivot movement of the operating arm from the cam action is insufficient to cause forceable engagement therebetween. However, should the velocity of the intermediate mast section become excessive as would reflect a cable failure or the like, the cam pitch causes the roller exiting toward the wave crest to develop a velocity with a directional component sufficient to pivot the operating arm counterclockwise component sufficient to pivot the operating arm counterclockwise beyond its normal extent in opposition to the spring bias. As this occurs, the operating arm engages trunnion 73 forcing bell crank 72 in a counterclockwise direction with a force sufficient to dislodge roller 52 from beneath guide rod 31. This results in the triggering device hereof effectively actuating the brake held by the guide rod to provide a positive vertical arrest of the mast section.

Critical therefore to the invention hereof is the cam pitch of individual cam slots 66 in that at a predetermined velocity at which the device is to be operative, it must impart the necessary directionalized velocity for pivoting the operating arm. To a large extent, the effectiveness of the cam slot can be adjusted by the tension setting of bias spring 68. The critical portion of the cam pitch is represented by the vertical distance 78 imparting a downward and outward acceleration component to the roller 63. Once crank arm 72 has been thrown to release guide rod 31, a manual reset is required to restore crane operation. This latter feature assures that an investigation of the braking cause will have an opportunity to be conducted before the brake can be released.

By the above description, there has been disclosed a novel triggering device that is simple in construction yet more highly reliable and velocity responsive than such devices in the prior art. It is velocity sensitive only to the component on which it is secured and is independent of other components or mechanisms that may be contained on the apparatus with which it is employed. It is normally contained exposed for easy visual observation of operation and maintenance and cannot reset itself as to always afford an opportunity of investigation before effecting a manual reset thereof. While it is shown and described in connection with operation of a crane brake, this is not to be considered as a limitation on the utility of this device since it quite obviously lends itself for accommodation on any variety of equipment having control mechanisms such as switches, brakes or the like which are to be similarly operative.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A triggering device for actuating operation of a control mechanism in response to a predetermined speed difference between relatively moving parts comprising in combination:
   (a) mounting means adapted to be secured onto one of the relatively moving parts between which relative movement is to be encountered;
   (b) a cam track adapted to be secured onto the other of the relatively moving parts between which relative movement is to be encountered extending in a direction aligned with the direction of said movement;

(c) an operating arm extending pivotally connected from at said mounting means for supporting a follower adapted to engage the cam pitch surface of said track and to be pivoted by said cam pitch in response to relative movement of said parts; and (d) actuating means pivotally connected at said mounting means to effect operation of a control mechanism in response to pivoting of said operating arm beyond a predetermined extent away from said cam track.

2. A triggering device according to claim 1 including means to preset the relative speed difference between parts at which said actuating means is responsively operative.

3. A triggering device according to claim 1 in which either of said mounting means and said cam track is adapted to be secured to a stationary one of said relatively moving parts.

4. A triggering device according to claim 1 including biasing means urging the operating arm toward the cam track to normally maintain the follower in surface contact thereagainst.

5. A triggering device according to claim 4 in which said actuating means comprises a rotatable shaft, a control mechanism actuator secured to a first portion of said shaft, and a lever secured to a second portion of said shaft and extending into the pivot path of said operating arm.

6. A triggering device according to claim 4 in which said biasing means comprises a tensioned spring and said cam pitch surface comprises a serial extension of like cam pitch effective to reciprocate the operating arm during the course of relative movement therebetween.

7. A triggering device according to claim 6 in which said cam pitch includes at least a portion effective at a predetermined increasing relative speed difference between said relatively moving parts to pivot said operating arm away from said cam track to an extent sufficient to operate said actuating means.

8. A triggering device according to claim 7 in which said actuating means comprises a rotatable shaft, a control mechanism actuator secured to a first portion of said shaft, and a lever secured to a second portion of said shaft and extending into the pivot path of said operating arm.

9. A triggering device according to claim 8 in which said control mechanism actuator comprises a member movable into and out of engagement with a control mechanism for effecting operation thereof.

References Cited

UNITED STATES PATENTS 3,269,561   8/1966   De Ligt _____ 717—178

U.S. Cl. X.R.

188—187; 212—128